(12) United States Patent  (10) Patent No.: US 8,548,666 B2
Matthews                   (45) Date of Patent:     Oct. 1, 2013

(54) AUTO-GUIDANCE

(75) Inventor: Paul Matthews, Bel Aire, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 13/336,254

(22) Filed: Dec. 23, 2011

(65) Prior Publication Data

US 2013/0166132 A1   Jun. 27, 2013

(51) Int. Cl.
    G06F 7/70    (2006.01)
(52) U.S. Cl.
    USPC .......................................... 701/23
(58) Field of Classification Search
    USPC ................... 701/23, 50, 221, 213
    See application file for complete search history.

(56) References Cited

U.S. PATENT DOCUMENTS

| 5,927,603 | A  | * | 7/1999  | McNabb ........................ 239/63 |
| 6,087,984 | A  | * | 7/2000  | Keller et al. ............ 342/357.31 |
| 6,199,013 | B1 | * | 3/2001  | O'Shea ........................ 701/431 |
| 6,353,409 | B1 | * | 3/2002  | Keller et al. ............ 342/357.31 |
| 6,647,328 | B2 | * | 11/2003 | Walker ............................ 701/36 |
| 7,437,230 | B2 | * | 10/2008 | McClure et al. ................ 701/50 |
| 7,522,992 | B2 | * | 4/2009  | Obradovich et al. ......... 701/426 |
| 8,190,337 | B2 | * | 5/2012  | McClure et al. ................ 701/50 |
| 8,209,103 | B2 | * | 6/2012  | Oyama et al. ................ 701/101 |
| 2008/0091309 | A1 | * | 4/2008 | Walker ............................. 701/1 |
| 2009/0118904 | A1 | * | 5/2009 | Birnie ........................... 701/41 |

* cited by examiner

Primary Examiner — Thomas Tarcza
Assistant Examiner — Alex C Dunn

(57) ABSTRACT

Auto-guidance may be provided. First, location information may be received and a location of a machine may be determined based on the location information. Once the location of the machine is determined, an auto-guidance data file may be loaded based on the determined location of the machine.

8 Claims, 3 Drawing Sheets

AUTO-GUIDANCE

BACKGROUND

Vehicle guidance systems are used in many types of vehicles to assist drivers in reaching a desired location and/or following a desired path. For instance, vehicle guidance systems may use control algorithms to direct vehicles from point to point. In other words, tractors and other agricultural vehicles may be equipped with vehicle guidance systems to assist operators in following a desired route across a field.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Overview

Figure 1:
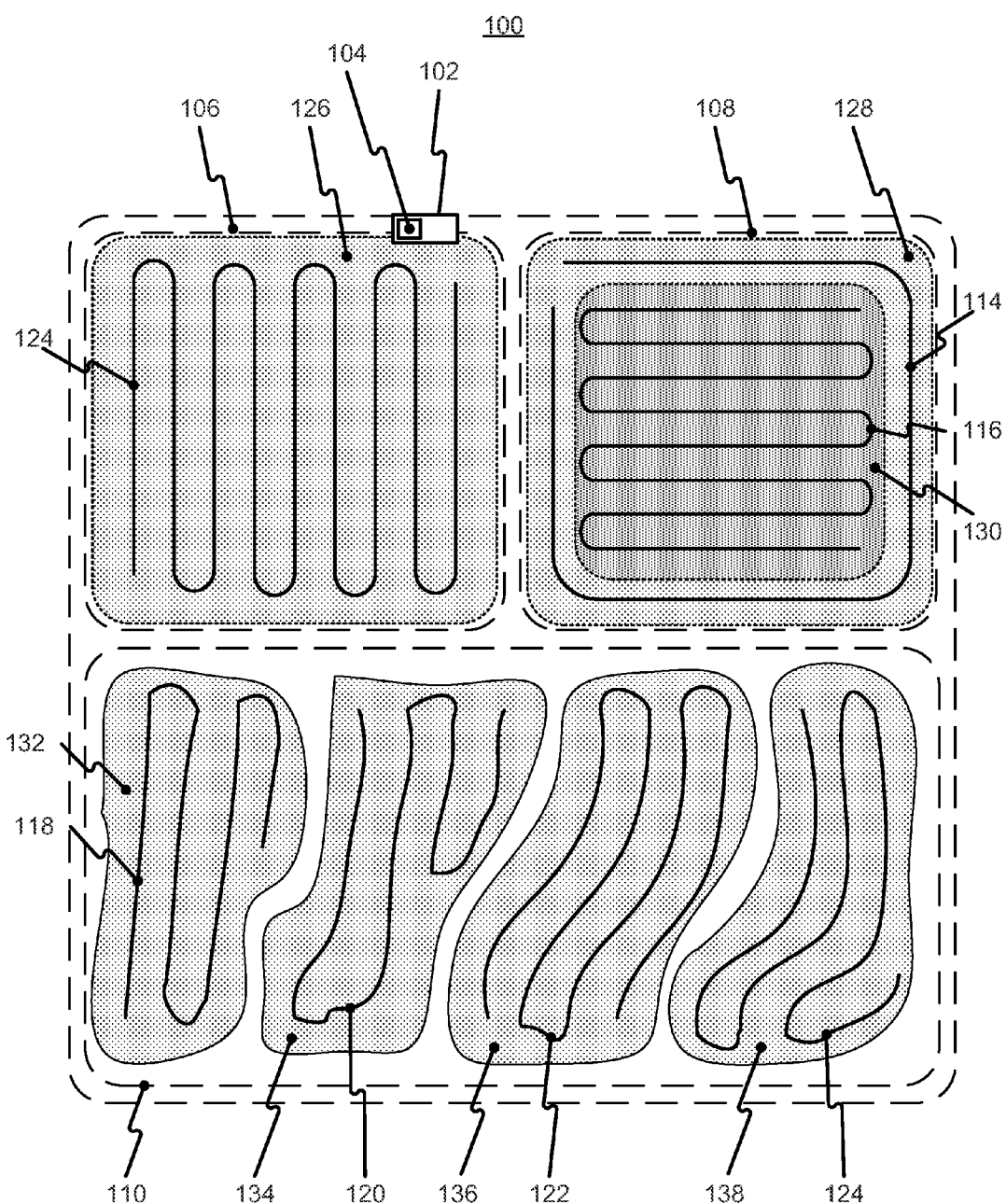
FIG. 1 is a diagram of an operating environment.

Auto-guidance may be provided. First, location information may be received and a location of a machine may be determined based on the location information. Once the location of the machine is determined, an auto-guidance data file may be loaded based on the determined location of the machine.

Both the foregoing general description and the following detailed description are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the detailed description.

EXAMPLE EMBODIMENTS

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

An auto-guidance system may automatically steer a machine (e.g., a tractor, a combine, or a sprayer) along a predefined path (e.g., a wayline) on a farm (i.e., a working environment) divided into fields. Each field may be divided into sections. Each field or section may be defined by a boundary and may have a different topology. The boundary and topology may necessitate the operator following different predefined paths (i.e., waylines). Creation of the waylines is described in U.S. patent application Ser. No. 12/649,023, entitled "Guidance Using a Worked Edge for Wayline Generation," filed on Dec. 29, 2009, and hereby incorporated by reference in its entirety.

As the operator moves from one field to another, the auto-guidance system may automatically load the auto-guidance data file of the field that the machine is located in. When the machine is not located on the farm, the auto-guidance system may unload any auto-guidance data file currently loaded and/or disable the auto-guidance system. The auto-guidance data file may comprise data representing a wayline corresponding to the field that the machine is located in. In addition, the auto-guidance data file may comprise data representing performance specifications such as a speed for the machine. For example, the auto-guidance data file may comprise data specifying the machine is to traverse a wayline at 12 mph.

In addition to loading and/or unloading the auto-guidance data file, the auto-guidance system may disable the auto-guidance system. For instance, depending on the location of the machine, the auto-guidance system may be disabled for safety or other reasons. For example, when the machine is operated outside a predetermined area (e.g., outside a farm) the auto-guidance system may be disabled. Unloading the auto-guidance file and/or disabling the auto-guidance system may prevent a user from accidentally engaging the auto-guidance system.

FIG. 1 is a block diagram of an operating environment (e.g., a farm) for providing auto-guidance. Operating environment 100 may comprise a machine 102 operating on a farm 100. Machine 102 may comprise an auto-guidance processor 104. Examples of machine 102 may include an agricultural implement such as a tractor, a combine, or a sprayer.

Farm 100 may be divided into a first field 106, a second field 108, and a third field 110. First field 106 may be traversed by a first wayline 112. Second field 108 may be traversed by a second wayline 114 and a third way line 116. Third field 110 may be traversed by a fourth wayline 118, fifth wayline 120, sixth wayline 122, and seventh wayline 124.

First wayline 112 may cover a first geofence 126 (i.e., a geographic region). Second wayline 114 may cover a second geofence 128. Third wayline 116 may cover a third geofence 130. Fourth wayline 118 may cover a fourth geofence 132. Fifth wayline 120 may cover a fifth geofence 134. Sixth wayline 122 may sixth geofence 136 and seventh wayline 124 may cover a seventh geofence 138. As shown in FIG. 1, the wayline for a particular geofence may be straight, curved, etc.

While FIG. 1 shows farm 100 divided into three fields and covered by seven geofences and seven waylines, any number of waylines may be defined on any number of farms and/or fields. For instance and as shown in FIG. 1, a farm may comprise a one field having a single wayline, a second field, having two waylines, and third field having four waylines. The waylines may be straight, curved, concentric circles having a center of a geofence, etc.

Figure 2:
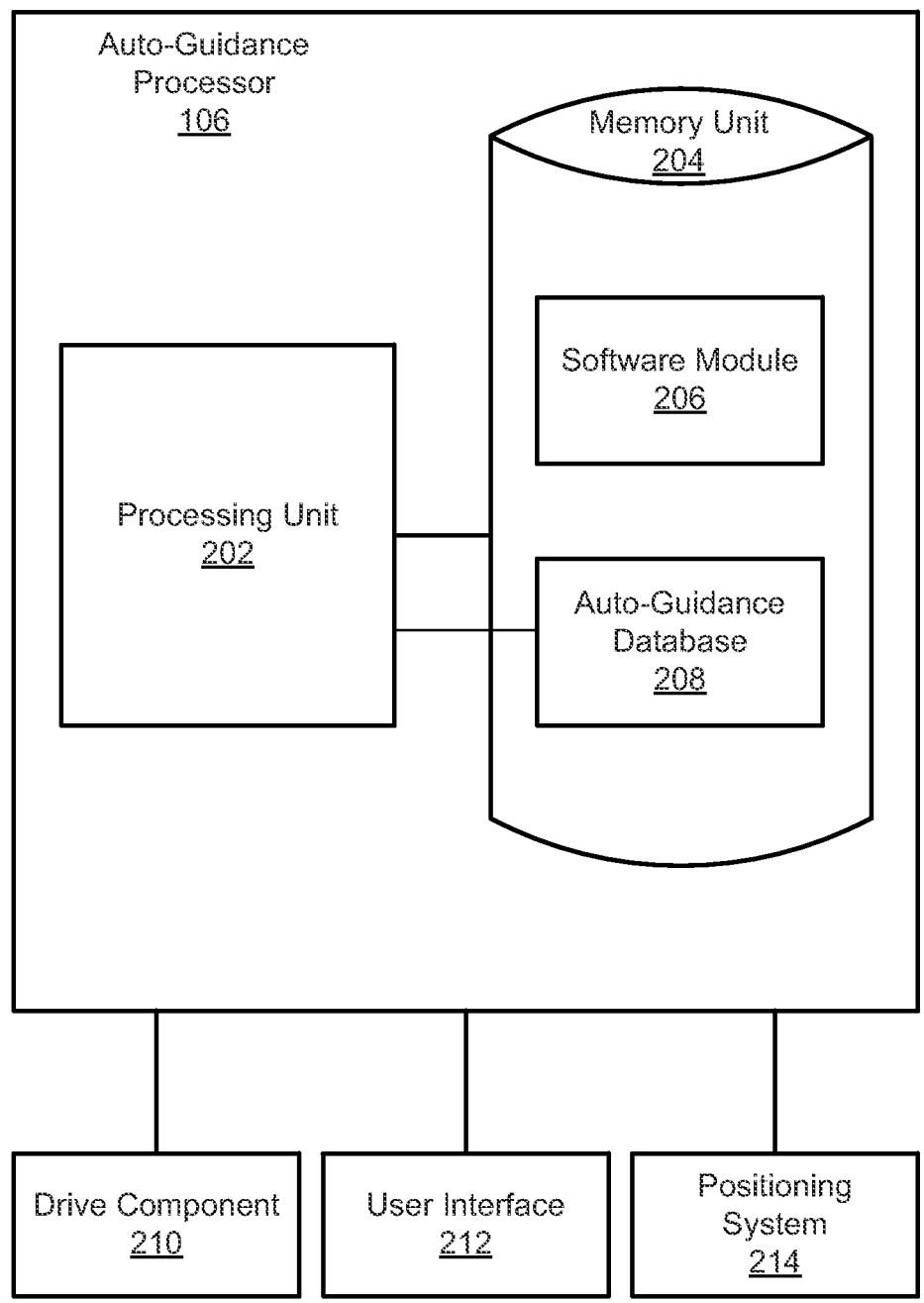
FIG. 2 is a block diagram of an auto-guidance processor.

FIG. 2 shows auto-guidance processor 104 in more detail. As shown in FIG. 2, auto-guidance processor 104 may include a processing unit 202 and a memory unit 204. Memory unit 204 may include a software module 206 and an auto-guidance database 208. Auto-guidance database 208 may comprise a plurality of auto-guidance data files. Auto-guidance processor 106 may also be operatively connected a drive component 210. Drive component 210 may comprise an engine and a steering linkage (not shown) for controlling movement of machine 102. While executing on processing unit 202, software module 206 may perform processes for providing auto-guidance, including, for example, one or more stages included in method 300 described below with respect to FIG. 3.

In addition, a positioning system 208 may be connected to auto-guidance processor 104. Positioning system 208 may determine the location of machine 102 or receiving information that may be used to determine machine 102's position. Examples of positioning system 208 include the Global Positioning System (GPS), cellular signals, etc.

Auto-guidance processor 104 ("the processor") may be implemented using an onboard engine control unit (ECU), a personal computer, a network computer, a mainframe, or other similar microcomputer-based workstation. The processor may be located on machine 102 or may be in a remote location. For instance, in an agricultural environment, the processor may comprise a computer located at a central location (e.g., a farm's central equipment storage and maintenance facility).

The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, or a wireless fidelity (Wi-Fi) access point. The aforementioned systems and devices are examples and the processor may comprise other systems or devices.

Figure 3:
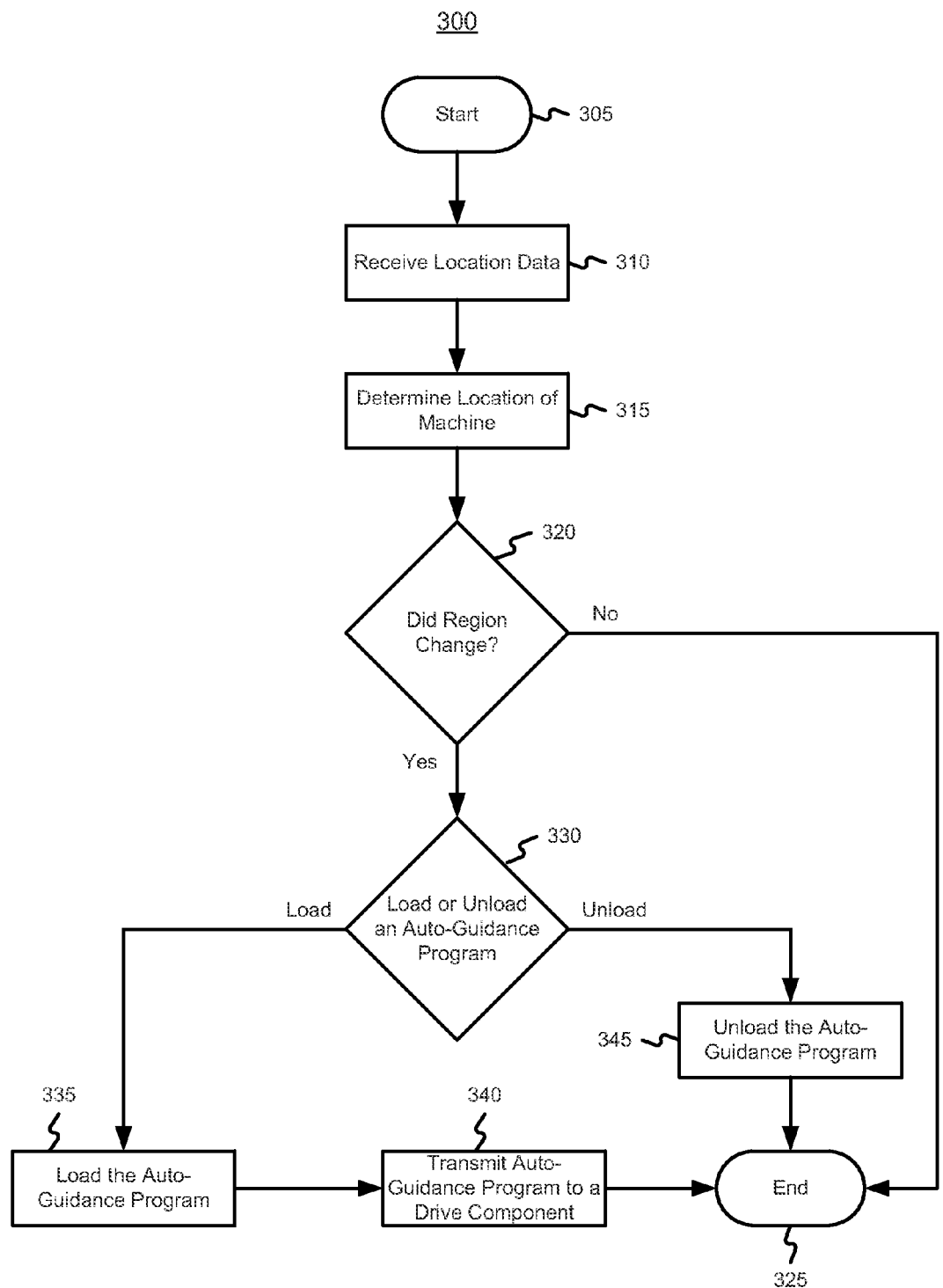
FIG. 3 is a flow chart of a method for providing auto-guidance.

FIG. 3 is a flow chart setting forth the general stages involved in a method 300 for auto-guidance. Method 300 may be implemented using, for example, auto-guidance processor 106 as described in more detail above. Ways to implement the stages of method 300 will be described in greater detail below.

Method 300 may begin at starting block 305 and proceed to stage 310 where auto-guidance processor 106 may receive location information. For example, after working in first field 106, machine 102 may be relocated to second field 108. After entering second field 108, auto-guidance processor 104 may receive the location information from a government maintained source (e.g., GPS signal) or a privately maintained source (e.g., a cell tower). In addition to location information, auto-guidance processor 104 may be operative to receive additional data such as speed and an orientation of machine 102 (e.g., facing north, south, east, or west).

From stage 310, where auto-guidance processor 104 received the location information, method 300 may advance to stage 315 where auto-guidance processor 106 may determine a location of machine 102 based on the location information. For example, auto-guidance processor 104 may receive time information from four GPS satellites. Using the time information, auto-guidance processor 104 may determine a latitude and a longitude of machine 102.

Using the latitude and the longitude, auto-guidance processor 104 may access auto-guidance database 208. For example, based on a location, which may be defined by the latitude and longitude, auto-guidance processor 104 may retrieve from auto-guidance database 208 a geographic reference data corresponding to the location. The geographic reference data may include, for example, shape files outlining a geographic fence (i.e., the boundaries) of first field 106, second field 108, third field 110, first geofence 126, second geofence 128, etc. As an example, auto-guidance processor 104 may determine the latitude and longitude of machine 102 and compare that coordinate with the geographic reference data. If the coordinate is within a boundary of second geofence 128, auto-guidance processor 104 may determine that machine 102 is located in second field 108.

Auto-guidance processor 104 may also receive information from more than one source. For instance, auto-guidance processor 104 may receive time information from both, four GPS satellites and two cell towers. The location information from the cell tower may be used to triangulate machine 102's location that may be cross-referenced with a location determination based on the four GPS satellite signals. If the triangular location differs from the GPS determined location, an operator may be alerted by an audible or visual alarm. In addition, if the triangular location differs from the GPS determined location, auto-guidance processor 104 may return an unidentified location. Furthermore, if auto-guidance processor 104 determines machine 102 is not located within farm 100, auto-guidance processor 104 may return an unidentified location.

Once auto-guidance processor 104 has determined the location of machine 102 in stage 315, method 300 may continue to decision block 320 where auto-guidance processor 104 may determine if there has been a region change. In other words, has machine 102 moved from first geofence 126 to second geofence 128?

If at decision block 320 auto-guidance processor 104 determines machine 102 has not changed regions, method 300 may continue to stage 325 where method 300 may terminate. If at decision block 320 auto-guidance process 104 determines machine 102 has changed regions, method 300 may proceed to decision block 330 where auto guidance processor 104 may determine if an auto guidance program needs to be loaded or unload.

If at decision block 330 auto-guidance processor 104 determines the auto-guidance data file needs to be loaded, method 300 may continue to stage 335 where auto-guidance processor 104 may load the auto-guidance data file based on the determined location of machine 102. For example, after determining the location of machine 102, auto-guidance processor 104 may select the auto-guidance data file containing a wayline (e.g., second wayline 114) from a plurality auto-guidance data files. Each of the plurality of auto-guidance data files may contain data defining at least one wayline (e.g., first wayline 112, second wayline 114, third wayline 116, etc.). After selecting the auto-guidance data file, auto-guidance processor 104 may load the selected auto-guidance data file and any waylines and performance specifications it may contain. For instance, in addition to the auto-guidance data file comprising at least one wayline, the auto-guidance data file may comprise, for example, performance specifications such as machine 102's speed and desired power output.

After loading the auto-guidance data file at stage 335, method 300 may continue to stage 340 where auto-guidance processor 104 may transmit the auto-guidance data file to drive component 210. Method 300 may then terminate at stage 325. Drive component 210 may then use the auto-guidance data file to propel machine 102. For example, drive component 210 may receive auto-guidance data file containing first wayline 112. After receiving the auto-guidance data file containing first wayline 112, drive component 210 may propel machine 102 along first wayline 112 and method 300 may then terminate.

If at decision block 330 auto-guidance processor 104 determines the auto-guidance data file needs to be unloaded, method 300 may continue to stage 345 where auto-guidance processor 104 may unload the auto-guidance data file based on the determined location of machine 102. For example, after determining the location of machine 102, auto-guidance processor 104 may unload the auto-guidance data file if auto-guidance processor 104 determines machine 102 is not located within a predefined area (e.g., on farm 100 or any geofence). In addition, if auto-guidance processor 104 cannot determine machine 102's location (e.g., it is at a location not found in the shape files or there is an error with the auto-guidance system), auto-guidance processor 104 may unload the auto-guidance data file and/or disable the auto-guidance system.

After unloading the auto-guidance data file in stage 345, method 300 may continue then terminate at stage 335. Method 300 may repeat at regular interval. For example, method 300 may repeat every 30 seconds, minute, 30 minutes, etc. In addition, at machine 102's start up, the location of machine 102 may be predefined as unknown so an auto-guidance data file may not be loaded until method 300 has run at least once.

Other examples of instances where auto-guidance processor 104 may not need to load an auto-guidance data file include, for example, when auto-guidance processor 104 determines machine 102 is not located on farm 100 or when there may be an error with the auto-guidance system. Examples of when there may be an error with the auto-guidance system include when auto-guidance processor 104 is unable to determine machine 102's location or machine 102 exceeds a maximum speed. Unloading the auto-guidance data file may be a safety feature because unloading the auto-guidance data file may operate to disable the auto-guidance system. Without auto-guidance data file loaded, the auto-guidance system may be disabled because the auto-guidance system may not be able to determine a travel direction.

For example, when the auto-guidance data file is not loaded, auto-guidance processor 104 may not allow the operator to engage the auto-guidance system. For instance, the operator may be operating machine 102 on a road, and not farm 100, at a high rate speed. In this instance, auto-guidance processor 104 may unload the auto-guidance data file in order to disable the auto-guidance system. Disabling the auto-guidance system may prevent the operator from accidently engaging the auto-guidance system.

An embodiment may comprise a method for auto-guidance. The method may include receiving location information and determining a location of a machine based on the received location information. Once the location of the machine is determined, an auto-guidance data file may be loaded based on the determined location of the machine.

Another embodiment may comprise a drive component operative to propel an apparatus and an auto-guidance processor coupled to the drive component. The auto-guidance processor may be operative to receive location information and determine a location of an apparatus based on the received location information. Once the location of the machine is determined, the auto-guidance processor may load an auto-guidance data file based on the determined location of the apparatus.

Yet another embodiment may comprise a memory storage and a processing unit coupled to the memory storage. The processing unit may be operative to receive location information and determine a location of a machine based on the received location information. Once the machine's location is determined, the processing unit may be operative to load an auto-guidance data file based on the determined location of the machine.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method of steering an agricultural machine comprising:
    storing in a database a plurality of auto-guidance data files for a farm, the farm comprising a plurality of fields, each of the plurality of fields having a corresponding auto-guidance data file, wherein each auto-guidance data file comprises at least data defining a wayline;
    receiving, at a processor, location information;
    determining, by the processor, a location of the agricultural machine based on the received location information;
    if the location of the agricultural machine is determined to be on a first one of the plurality of fields on the farm, loading, into a memory, an auto-guidance data file from the plurality of auto-guidance data files for the field on which the machine is located based on the determined location of the machine;
    propelling the agricultural machine on the farm;
    determining, by the processor, a new location of the agricultural machine based on received location information and if the location of the machine is determined to be on a second field of the farm different than the first field where previously located, automatically unloading from the memory the auto-guidance data file for said first field and loading into the memory from the database an auto-guidance data file from the plurality of auto-guidance data files for the second field on which the machine is now located based on the determined location of the machine.

2. The method of claim 1, further comprising unloading, from the processor, the auto-guidance data file when a speed of the machine exceeds a maximum speed.

3. The method of claim 1, further comprising disabling, by the processor, an auto-guidance system when the machine is not within a predetermined area.

4. An agricultural machine configured to be propelled on a farm comprising:
    a drive component operative to propel the agricultural machine; and
    an auto-guidance processor coupled to the drive component, the auto-guidance processor operative to:
        store in a database a plurality of auto-guidance data files for the farm, the farm comprising a plurality of fields, each of the plurality of fields having a corresponding auto-guidance data file, wherein each auto-guidance data file comprises at least data defining a wayline;
        receive location information;
        determine a location of the agricultural machine based on the received location information;
        if the location of the agricultural machine is determined to be on a first one of the plurality of fields on the farm, load an auto-guidance data file from the plurality of auto-guidance data files for the field on which the machine is located based on the determined location of the agricultural machine; and
        determine a new location of the agricultural machine after the agricultural machine has been propelled on the farm based on received location information and if the location of the machine is determined to be on a second field of the farm different than the first field where previously located, automatically unloading from the memory the auto-guidance data file for said first field and loading into the memory from the database an auto-guidance data file from the plurality of auto-guidance data files for the second field on which the machine is now located based on the determined location of the machine.

5. The apparatus of claim 4, further comprising the auto-guidance processor operative to unload the auto-guidance data file when the location of the machine cannot be determined.

6. The apparatus of claim 4, further comprising the auto-guidance processor operative to unload the auto-guidance data file when a speed of the machine exceeds a maximum speed.

7. The apparatus of claim 4, further comprising the auto-guidance processor operative to disable an auto-guidance system when the machine is not within a predetermined area.

8. The method of claim 1, wherein determining, by the processor, the location of the machine based on the received location information comprises determining that the machine is located within a geofence.

* * * * *